(12) United States Patent
Lee et al.

(10) Patent No.: US 9,225,960 B2
(45) Date of Patent: Dec. 29, 2015

(54) APPARATUS AND METHOD FOR ATTENUATING STEREOSCOPIC SENSE OF STEREOSCOPIC IMAGE

(75) Inventors: Sang-Kyung Lee, Anyang-si (KR); Kwang-Cheol Choi, Gwacheon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 574 days.

(21) Appl. No.: 13/252,838

(22) Filed: Oct. 4, 2011

(65) Prior Publication Data

US 2012/0081520 A1   Apr. 5, 2012

(30) Foreign Application Priority Data

Oct. 4, 2010 (KR) ........................ 10-2010-0096565

(51) Int. Cl.
  *G06T 15/00* (2011.01)
  *H04N 13/00* (2006.01)
(52) U.S. Cl.
  CPC .... *H04N 13/0022* (2013.01); *H04N 2013/0081* (2013.01); *H04N 2013/0092* (2013.01)
(58) Field of Classification Search
  CPC .......... H04N 13/0022; H04N 13/0239; H04N 13/0296; H04N 13/0055; H04N 2013/0081; H04N 2013/0092; G06T 7/0022
  USPC ........................................................ 348/47
  See application file for complete search history.

(56) References Cited

U.S. PATENT DOCUMENTS

| | | | | |
|---|---|---|---|---|
| 4,264,926 A | * | 4/1981 | Etra | 348/43 |
| 5,671,992 A | * | 9/1997 | Richards | 353/7 |
| 5,726,704 A | * | 3/1998 | Uomori | 348/47 |
| 5,801,760 A | * | 9/1998 | Uomori | 348/47 |
| 5,917,539 A | * | 6/1999 | Sorensen et al. | 348/56 |
| 6,005,607 A | * | 12/1999 | Uomori et al. | 348/42 |
| 6,108,005 A | * | 8/2000 | Starks et al. | 345/419 |
| 6,353,457 B2 | * | 3/2002 | Uomori et al. | 348/47 |
| 6,392,689 B1 | * | 5/2002 | Dolgoff | 348/44 |
| 6,417,880 B1 | * | 7/2002 | Uomori et al. | 348/42 |
| 6,504,649 B1 | * | 1/2003 | Myers | 359/454 |

(Continued)

FOREIGN PATENT DOCUMENTS

| | | |
|---|---|---|
| KR | 10-2005-0078737 | 8/2005 |
| KR | 10-2005-0121080 | 12/2005 |
| KR | 10-2006-0036230 | 4/2006 |

OTHER PUBLICATIONS

Tanabe et al, Disparity-energy signals in perceived stereoscopic depth, 2008.*

(Continued)

*Primary Examiner* — Andy Rao
*Assistant Examiner* — Shan Elahi

(57) ABSTRACT

An apparatus and method for attenuating a stereoscopic sense of a stereoscopic image. To generate a stereoscopic image to which a disparity is applied, an object for which a stereoscopic sense attenuation is performed is extracted from among at least one object in the stereoscopic image, a stereoscopic sense attenuation degree corresponding to a position of the at least one object is calculated, and a final stereoscopic image in which the calculated stereoscopic sense attenuation degree is applied to the extracted object is output. Accordingly, a stereoscopic sense of a stereoscopic image displayed to overlap a display screen edge is attenuated, thereby minimizing eye fatigue and visual displeasure.

20 Claims, 13 Drawing Sheets

(56) References Cited

U.S. PATENT DOCUMENTS

| | | | |
|---|---|---|---|
| 6,798,406 B1* | 9/2004 | Jones et al. | 345/419 |
| 6,816,158 B1* | 11/2004 | Lemelson et al. | 345/419 |
| 6,885,392 B1* | 4/2005 | Mancuso et al. | 348/36 |
| 6,965,699 B2* | 11/2005 | Jeong et al. | 382/232 |
| 7,557,824 B2* | 7/2009 | Holliman | 348/46 |
| 7,705,887 B2* | 4/2010 | Tsubaki | 348/211.4 |
| 7,899,321 B2* | 3/2011 | Cameron et al. | 396/325 |
| 7,907,793 B1* | 3/2011 | Sandrew | 382/284 |
| 8,159,525 B2* | 4/2012 | Park et al. | 348/47 |
| 8,265,477 B2* | 9/2012 | Pace et al. | 396/324 |
| 8,300,086 B2* | 10/2012 | Pockett et al. | 348/42 |
| 8,310,554 B2* | 11/2012 | Aggarwal et al. | 348/211.11 |
| 8,340,618 B2* | 12/2012 | Sorrells et al. | 455/313 |
| 8,385,681 B2* | 2/2013 | Weiss | 382/275 |
| 8,436,893 B2* | 5/2013 | McNamer et al. | 348/50 |
| 8,488,868 B2* | 7/2013 | Tam et al. | 382/154 |
| 8,508,580 B2* | 8/2013 | McNamer et al. | 348/43 |
| 8,548,269 B2* | 10/2013 | Zargarpour et al. | 382/284 |
| 8,643,699 B2* | 2/2014 | Yu et al. | 348/43 |
| 8,644,593 B2* | 2/2014 | Woo | 382/154 |
| 8,686,993 B2* | 4/2014 | Tokuda | 345/419 |
| 8,754,929 B1* | 6/2014 | Prince | 348/47 |
| 8,761,541 B2* | 6/2014 | Tian et al. | 382/154 |
| 8,773,509 B2* | 7/2014 | Pan | 348/47 |
| 8,937,644 B2* | 1/2015 | Tin | 348/46 |
| 2001/0015847 A1* | 8/2001 | Sugawara | 359/462 |
| 2003/0095306 A1* | 5/2003 | Divelbiss et al. | 359/115 |
| 2004/0145655 A1* | 7/2004 | Tomita | 348/51 |
| 2004/0212725 A1* | 10/2004 | Raskar | 348/370 |
| 2005/0190180 A1* | 9/2005 | Jin et al. | 345/419 |
| 2005/0195477 A1* | 9/2005 | Kornfeld | 359/462 |
| 2007/0046809 A1* | 3/2007 | Nakamura | 348/362 |
| 2008/0024596 A1* | 1/2008 | Li et al. | 348/47 |
| 2008/0151042 A1* | 6/2008 | Wang | 348/49 |
| 2009/0005961 A1* | 1/2009 | Grabowski et al. | 701/200 |
| 2009/0160931 A1* | 6/2009 | Pockett et al. | 348/42 |
| 2010/0091098 A1* | 4/2010 | Yoshifuji et al. | 348/54 |
| 2011/0025825 A1* | 2/2011 | McNamer et al. | 348/46 |
| 2011/0026807 A1* | 2/2011 | Wang | 382/154 |
| 2011/0134213 A1* | 6/2011 | Tsukagoshi | 348/43 |
| 2011/0175904 A1* | 7/2011 | van Baar et al. | 345/419 |
| 2011/0229012 A1* | 9/2011 | Singhal | 382/154 |
| 2011/0255775 A1* | 10/2011 | McNamer et al. | 382/154 |
| 2011/0311128 A1* | 12/2011 | Wilkinson et al. | 382/154 |
| 2012/0002014 A1* | 1/2012 | Walsh | 348/47 |
| 2012/0155786 A1* | 6/2012 | Zargarpour et al. | 382/284 |
| 2012/0249750 A1* | 10/2012 | Izzat et al. | 348/47 |

OTHER PUBLICATIONS

Stein et al, Attenuating Stereo Pixel-Locking via Affine Window Adaptation, 2006.*

Northam et al, Consistent Stylization and Painterly Rendering of Stereoscopic 3D Images, Jun. 2012.*

Lambooij et al, Evaluation of Stereoscopic Images: Byeond 2D Quality, Jun. 2011.*

Didyk et al, A Luminance-Contrast-Aware Disparity Model and Applications, 2012.*

* cited by examiner

APPARATUS AND METHOD FOR ATTENUATING STEREOSCOPIC SENSE OF STEREOSCOPIC IMAGE

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Oct. 4. 2010 and assigned Ser. No. 10-2010-0096565, the contents of which are incorporated herein by reference.

TECHNICAL FIELD OF THE INVENTION

The present invention relates generally to a stereoscopic image attenuating apparatus and method, and more particularly, to an apparatus and method for attenuating a stereoscopic sense of a stereoscopic image displayed to overlap a screen edge.

BACKGROUND OF THE INVENTION

In general, a stereoscopic image is generated based on a principle of recognizing a spatial sense by using disparities between images perceived by the left and right eyes of a viewer. At least two cameras are disposed in parallel to capture a stereoscopic image so that the disparities according to the at least two cameras are applied to all objects in the stereoscopic image.

As such, two images captured using left and right cameras are combined so that a user has a stereoscopic sense of the combined image.

The principle may also be applied to a computer graphics field. In a computer graphics rendering process, a stereoscopic image is generated by recognizing a spatial sense using virtual cameras, wherein the virtual cameras are disposed on the left and right to render the stereoscopic image.

The rendered stereoscopic image is viewed in front of or behind a display screen to give a stereoscopic sense to a user.

As described above, conventionally, for each image or group of images captured by cameras, a stereoscopic image transformed by post-processing, and a stereoscopic image rendered by a computer graphics technique is synthesized as a final stereoscopic image using disparities between left and right images to be displayed on a screen.

However, when a stereoscopic image is displayed on a display screen, it is difficult for a portion of the stereoscopic image overlapping a screen edge to be perceived as a stereoscopic shape regardless of a stereoscopic sense, and even though it is perceived as a stereoscopic shape, a blur image on the display screen may result in eye fatigue and visual displeasure to a user.

To prevent this, a device is needed to real-time compensate for disparities at a screen edge while playing a stereoscopic image, the disparities varying according to display attributes.

SUMMARY OF THE INVENTION

To address the above-discussed deficiencies of the prior art, it is a primary object to provide at least the advantages below. Accordingly, an aspect of the present invention is to provide an apparatus and method for attenuating a stereoscopic sense of a stereoscopic image displayed so as to overlap a screen edge.

According to one aspect of the present invention, there is provided an apparatus for attenuating a stereoscopic sense. The apparatus includes a graphic processor configured to generate a stereoscopic image to which a disparity is applied. The apparatus also includes a stereoscopic sense attenuator configured to perform a stereoscopic sense attenuation according to a position of at least one object in the stereoscopic image. The apparatus further includes a controller configured to control the stereoscopic sense attenuator to extract one of the at least one object for which the stereoscopic sense attenuation is performed, calculate a stereoscopic sense attenuation degree corresponding to the position of the at least one object, and output a final stereoscopic image in which the calculated stereoscopic sense attenuation degree is applied to the extracted object when the stereoscopic image is generated by the graphic processor.

According to another aspect of the present invention, there is provided a method for attenuating a stereoscopic sense in a stereoscopic sense attenuating apparatus to generate a stereoscopic image to which disparity is applied. The method includes extracting an object for which a stereoscopic sense attenuation is performed from among at least one object in the stereoscopic image. The method also includes calculating a stereoscopic sense attenuation degree corresponding to a position of the at least one object. The method further includes outputting a final stereoscopic image in which the calculated stereoscopic sense attenuation degree is applied to the extracted object.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. In the following description, well-known functions or constructions are not described in detail since they would obscure the invention with unnecessary detail.

Figure 1:
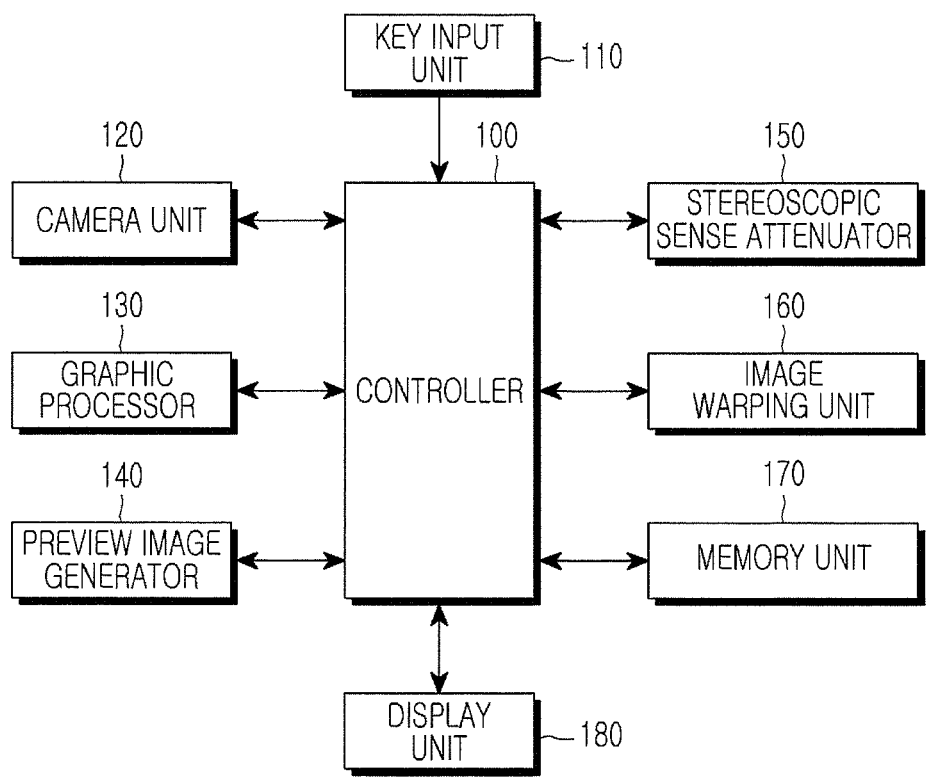
FIG. 1 is a block diagram illustrating a configuration of an apparatus for attenuating a stereoscopic sense, according to an embodiment of the present invention.
Figure 2:
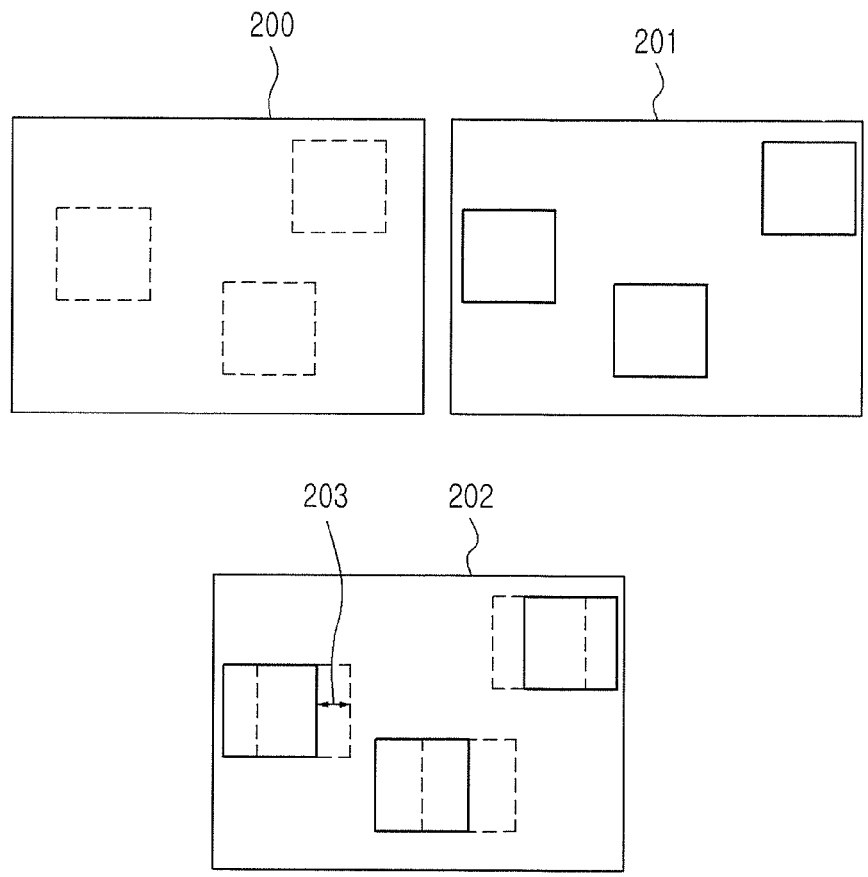
FIGS. 2 to 7 are illustrative diagrams for describing a process of attenuating a stereoscopic sense of a stereoscopic image in the apparatus for attenuating a stereoscopic sense, according to an embodiment of the present invention.

FIG. 1 is a block diagram illustrating a configuration of an apparatus for attenuating a stereoscopic sense of a stereoscopic image, according to an embodiment of the present invention.

The apparatus shown in FIG. 1 may include a controller 100, a key input unit 110, a camera unit 120, a graphic processor 130, a preview image generator 140, a stereoscopic sense attenuator 150, an image warping unit 160, a memory unit 170, and a display unit 180.

When a request for displaying a stereoscopic image on a screen of the display unit 180 is input through the key input unit 110, the controller 100 controls the graphic processor 130 to combine left and right images stored in the memory unit 170, thereby generating the stereoscopic image. The controller 100 may control the graphic processor 130 to generate the stereoscopic image based on a computer graphics technique.

The controller 100 determines whether an object in the stereoscopic image is displayed so as to overlap a screen boundary area of the display unit 180. If it is determined that the stereoscopic image is displayed so as to overlap the screen boundary area, the controller 100 controls the stereoscopic sense attenuator 150 to attenuate a stereoscopic sense of the object overlapping the screen boundary area so that disparity of the stereoscopic image is adjusted.

Since there may be distortion in the stereoscopic image of which the stereoscopic sense has been attenuated, the controller 100 controls the image warping unit 160 to minimize the distortion in the stereoscopic image of which the stereoscopic sense has been attenuated.

Thereafter, the controller 100 stores a final stereoscopic image in the memory unit 170 and controls the display unit 180 to display the final stereoscopic image on the screen thereof.

When a request for displaying a preview image on the screen of the display unit 180 is input through the key input unit 110, the controller 100 controls the graphic processor 130 to generate a stereoscopic image by using images input by the camera unit 120.

The controller 100 determines whether an object in the stereoscopic image is displayed so as to overlap a screen boundary area of the display unit 180. If it is determined that the stereoscopic image is displayed so as to overlap the screen boundary area, the controller 100 controls the stereoscopic sense attenuator 150 to attenuate a stereoscopic sense of the object overlapping the screen boundary area so that disparity of the stereoscopic image is adjusted.

The controller 100 controls the image warping unit 160 to minimize distortion in the stereoscopic image of which the stereoscopic sense has been attenuated, thereby outputting a final stereoscopic image. The controller 100 controls the preview image generator 140 to transform the final stereoscopic image to a preview image in a preview screen size.

Thereafter, the controller 100 controls the graphic processor 130 to display the preview image on the screen of the display unit 180.

A process of attenuating a stereoscopic sense is described with reference to FIGS. 2 to 7.

FIGS. 2 to 7 are illustrative diagrams for describing a process of attenuating a stereoscopic sense of a stereoscopic image in the apparatus shown in FIG. 1, according to an embodiment of the present invention.

The controller 100 controls the graphic processor 130 to combine a left image 200 and a right image 201 captured by two cameras, thereby generating a stereoscopic image 202. The stereoscopic image 202 has a disparity corresponding to reference numeral 203.

The stereoscopic image 202 visually gives a user a stereoscopic sense due to disparities between left objects in the left image 200 and right objects in the right image 201.

Figure 3:
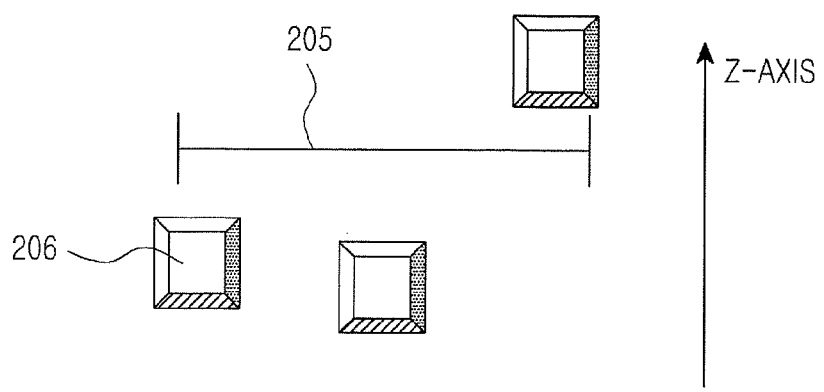
Figure 4:
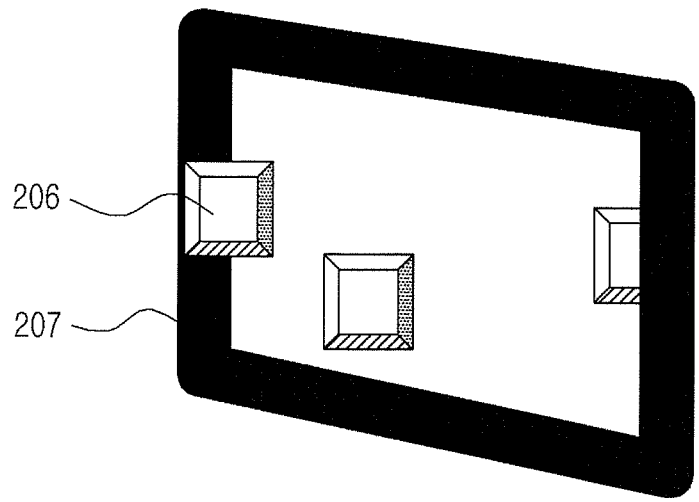

That is, the user may perceive objects in the stereoscopic image 202 due to the disparity as if the objects in the stereoscopic image 202 were placed at the front or rear based on a display screen 205 as shown in FIG. 3.

Here, a shape of an object 206 indicates an image formed in front of the display screen 205 by combining a left object and a right object on the display screen 205.

As such, since too large a disparity is applied to the shape of the object 206 displayed on an edge of the display screen 205, the formed image overlaps a display device frame 207, thereby giving a visual confusion to the user and increasing eye fatigue of the user.

Figure 5:
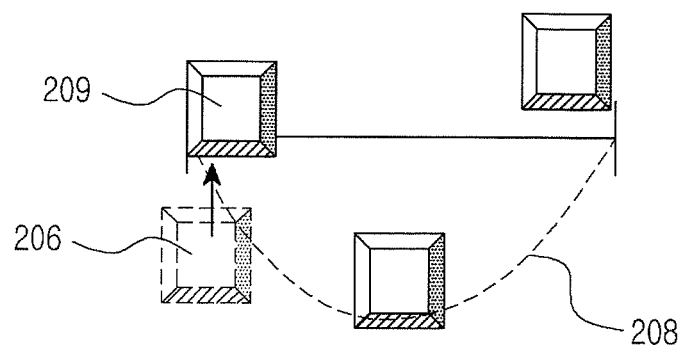
Figure 6:
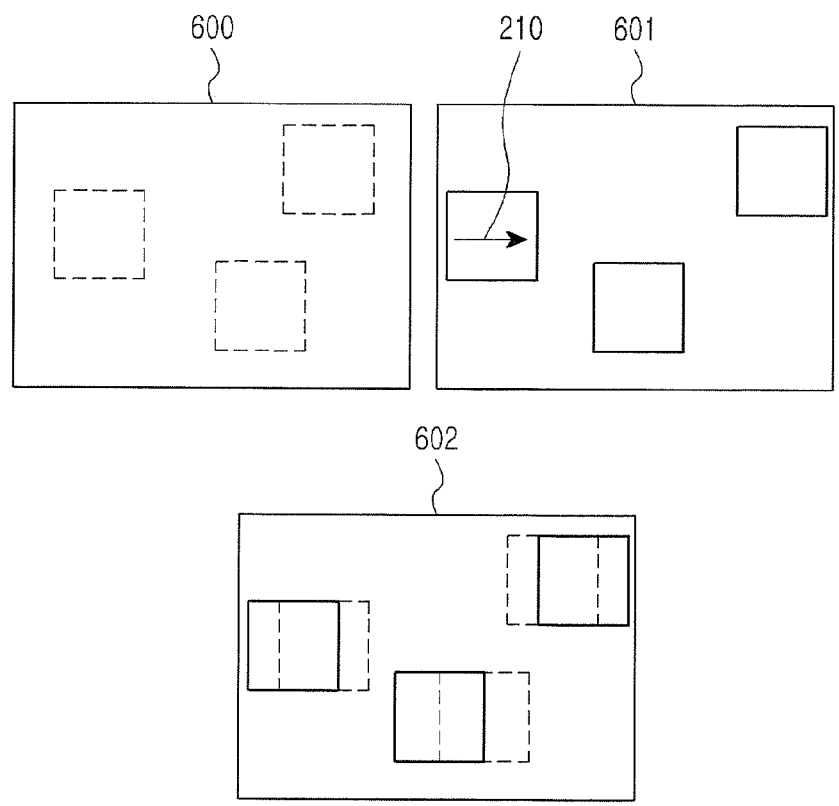

Accordingly, the controller 100 adjusts the disparity applied to the shape of the object 206 by using allowable disparity information indicating an allowable disparity according to a position on the display screen 205 as shown in FIG. 5. That is, if a stereoscopic sense of the shape of the object 206 is greater than a stereoscopic sense allowed at the edge of the display screen 205, the controller 100 may move the object 206 in the right direction to adjust the disparity applied to the shape of the object 206 as reference numeral 210 shown in FIG. 6. In other words, to adjust a disparity between an object on a right screen 601 and a corresponding object on a left screen 600, the controller 100 may move the object on the left screen 600 in the right direction to generate a stereoscopic image 602 of which a stereoscopic sense has been attenuated.

Figure 7:
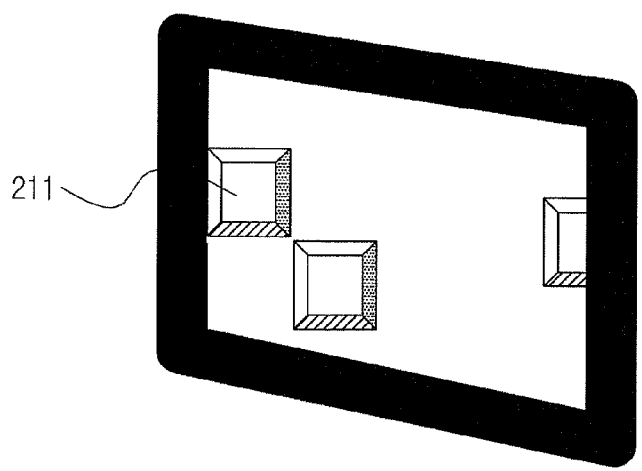

In FIG. 5, a shape of an object 209 shows a state in which a stereoscopic sense attenuation has been applied to the object 206, and a shape of an object 211 of FIG. 7 shows a state in which the shape of the object 206 viewed in front of the display screen 205 before applying the stereoscopic sense attenuation thereto is viewed behind the display screen 205 after adjusting the stereoscopic sense thereof.

The key input unit 110 includes a key for inputting a request for displaying a stereoscopic image on the screen of the display unit 180, a key for inputting a request for displaying a preview image on the screen of the display unit 180, and a key for inputting a request for driving the camera unit 120.

The camera unit 120 converts an optical signal input via a lens to an image. In the current embodiment, the camera unit 120 captures a left image and a right image with at least two cameras.

The graphic processor 130 generally renders a stereoscopic image, and more particularly, generates a stereoscopic image obtained by combining a left image and a right image stored in the memory unit 170 or generates a stereoscopic image based on a computer graphics technique.

The preview image generator 140 performs image processing to display an input image received from the camera unit 120 on the screen of the display unit 180. For example, since miniaturized image devices, such as digital cameras and cellular phone cameras, have a Liquid Crystal Display (LCD) having a small screen size to display an image, the preview image generator 140 generates a preview image suitable for an LCD screen size from the input image.

The stereoscopic sense attenuator 150 attenuates a stereoscopic sense of the rendered stereoscopic image by using pre-set allowable disparity information to adjust a disparity of the rendered stereoscopic image. Here, the allowable disparity information indicates information in which disparity allowed according to a position of each object in a stereoscopic image on the screen of the display unit 180 is pre-set. The allowable disparity information may be set differently according to manufacturers of display devices.

The image warping unit 160 minimizes distortion of a stereoscopic image of which the stereoscopic sense has been attenuated. For example, when a predetermined area of a right image extends to reduce a disparity of the predetermined area, although the disparity between the right image and a left image is reduced, a shape difference occurs between the right image and the left image. To minimize the shape difference, the image warping unit 160 warps the left image to a shape matching the distorted shape of the right image.

The memory unit 170 stores a left image and a right image captured by the at least two cameras and stores a stereoscopic image obtained by combining the left image and the right image. In addition, the memory unit 170 stores a final stereoscopic image of which the disparity has been adjusted.

The display unit 180, such as an LCD device, displays a stereoscopic image, i.e., a final stereoscopic image, on the screen thereof.

As described above, according to the present invention, when an object in a stereoscopic image is close to a display screen edge, a stereoscopic sense of the object is attenuated, thereby minimizing eye fatigue and visual displeasure due to excessive disparity.

In addition, according to the present invention, a stereoscopic sense attenuation is performed for a stereoscopic image obtained by combining images captured by at least two cameras or for a stereoscopic image generated based on a computer graphics technique.

The above-described embodiments are described in detail below.

Figure 8:
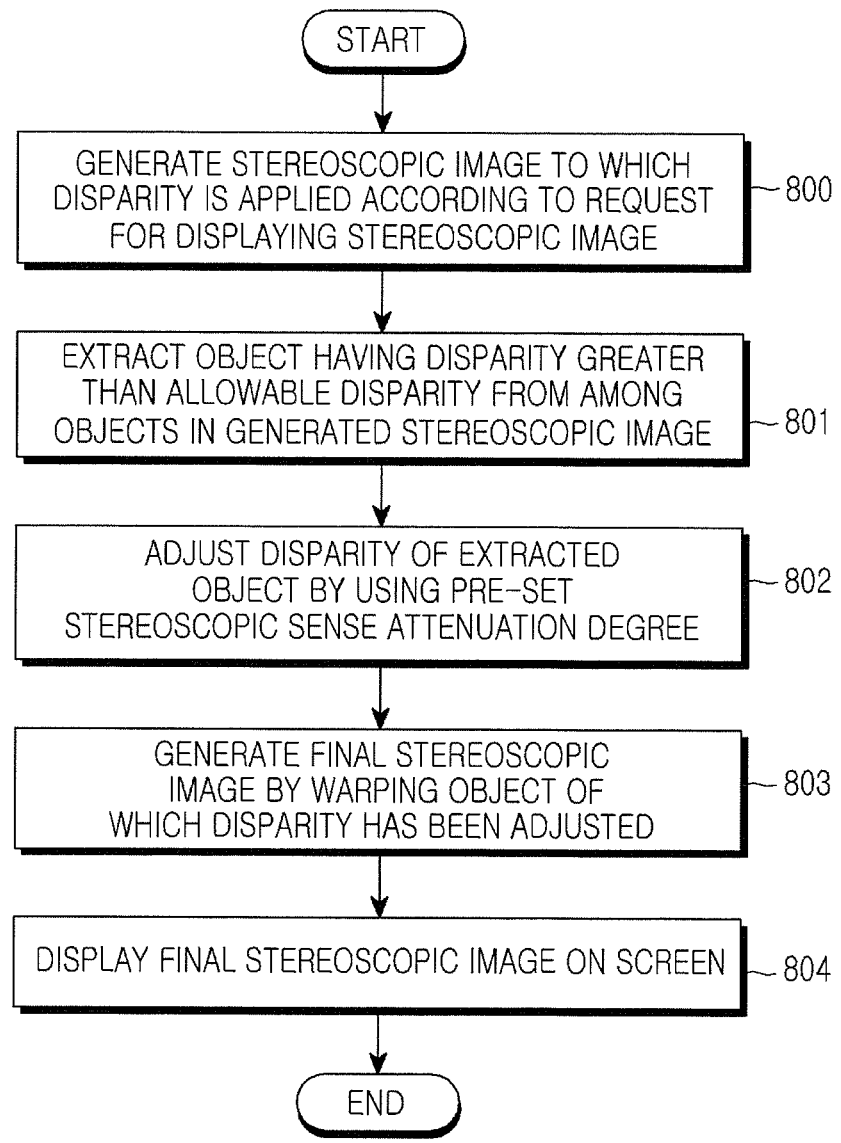
FIG. 8 is a flowchart illustrating a process of performing a stereoscopic sense attenuation of an object in a stereoscopic image in the apparatus for attenuating a stereoscopic sense, according to an embodiment of the present invention.

FIG. 8 is a flowchart illustrating a process of performing a stereoscopic sense attenuation of an object in a stereoscopic image in the apparatus shown in FIG. 1, according to an embodiment of the present invention.

Referring to FIG. 8, in block 800, when a request for displaying a stereoscopic image is received through the key input unit 110, the controller 100 controls the graphic processor 130 to generate a stereoscopic image to which a disparity has been applied. Here, the stereoscopic image to which the disparity has been applied is generated using a left image and a right image captured by two cameras.

In block 801, the controller 100 extracts an object having a disparity greater than an allowable disparity from among objects in the stereoscopic image. Here, the controller 100 may extract an object having a disparity greater than the allowable disparity by comparing a disparity of each object with a disparity allowed according to a position of each object.

In block 802, the controller 100 controls the stereoscopic sense attenuator 150 to calculate a stereoscopic sense attenuation degree according to the allowable disparity pre-set according to a display screen and adjust the disparity of the extracted object by using the calculated stereoscopic sense attenuation degree.

In the current embodiment, the adjustment may be described with reference to a process of adjusting a disparity by using images captured by at least two cameras and a process of adjusting a disparity of a stereoscopic image generated based on a computer graphics technique.

Figure 9:
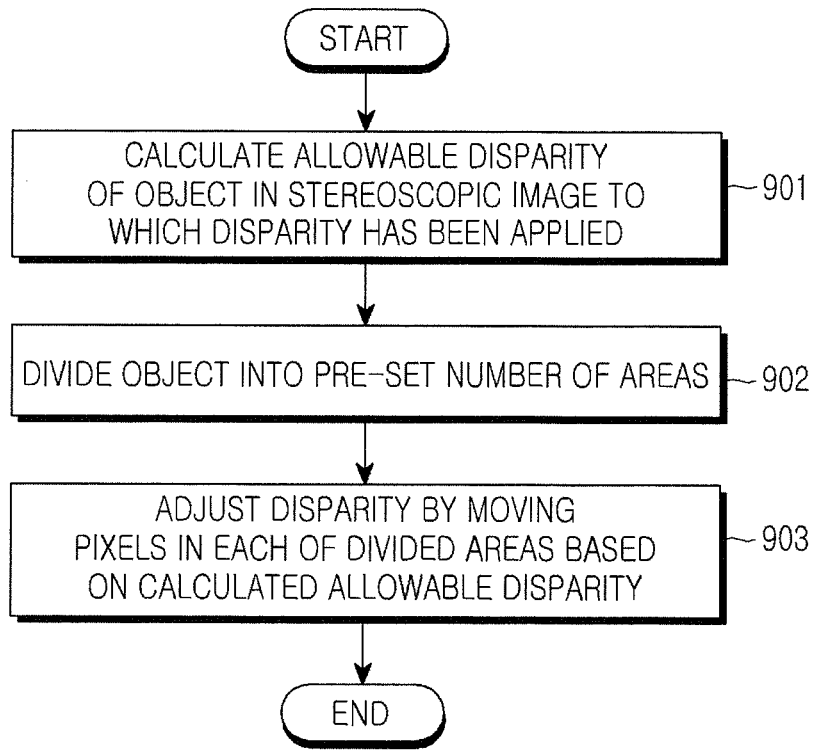
FIG. 9 is a flowchart illustrating a process of adjusting a disparity by using images captured by at least two cameras in a stereoscopic sense attenuator, according to an embodiment of the present invention.

FIG. 9 is a flowchart illustrating a process of adjusting a disparity by using images captured by at least two cameras in the stereoscopic sense attenuator 150, according to an embodiment of the present invention.

Referring to FIG. 9, in block 901, the stereoscopic sense attenuator 150 calculates a disparity allowed to each object in the stereoscopic image to which the disparity has been applied. This is described in detail with reference to FIGS. 10 to 12.

Figure 10:
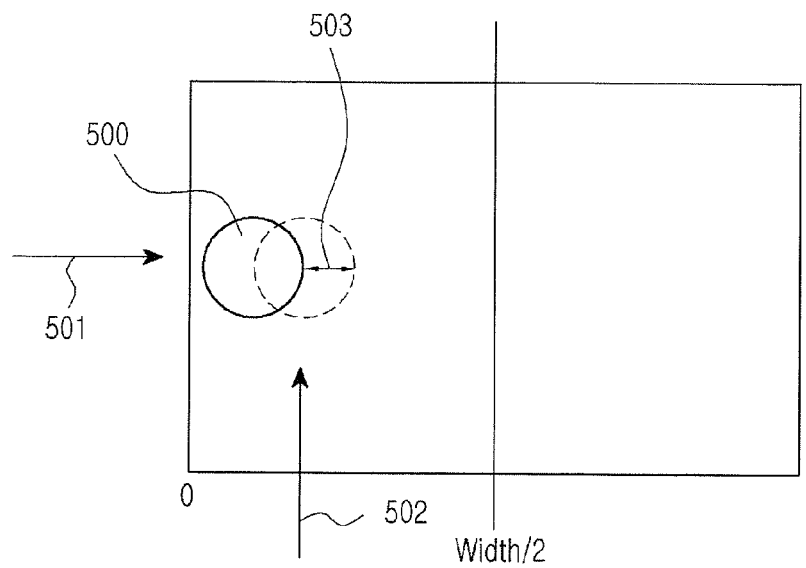
FIGS. 10 to 12 are illustrative diagrams for describing a process of attenuating a stereoscopic sense of an object obtained by combining left and right images captured by two cameras, according to an embodiment of the present invention.
Figure 11:
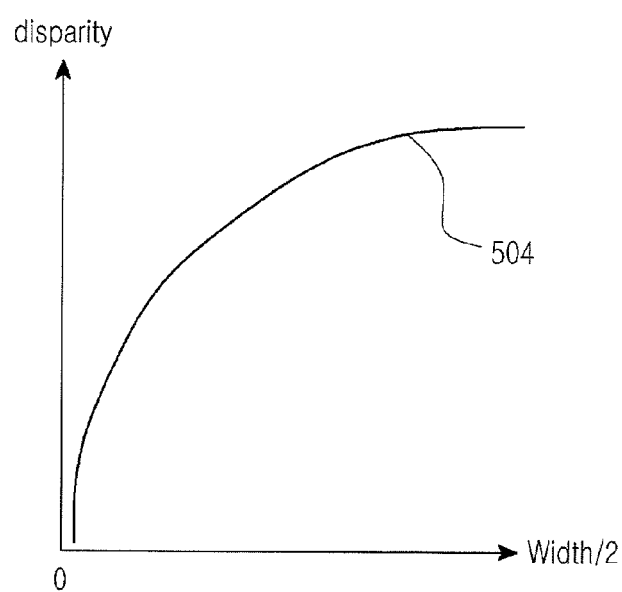
Figure 12:
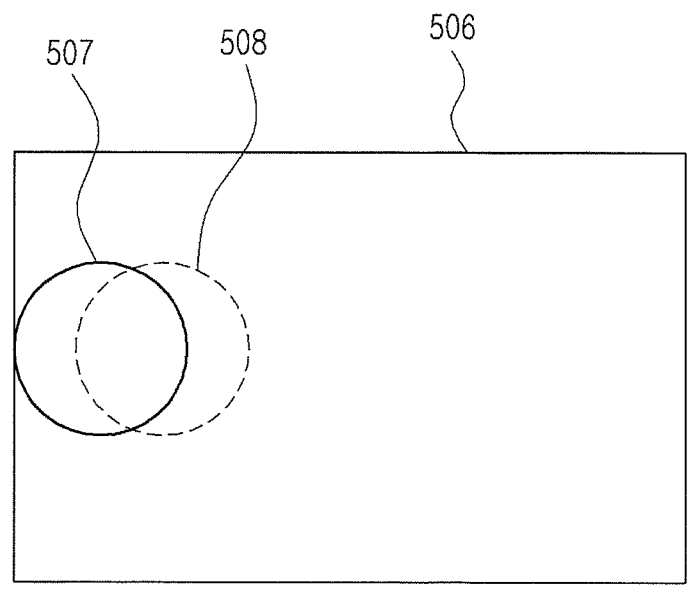

FIGS. 10 to 12 are illustrative diagrams for describing a process of attenuating a stereoscopic sense of an object obtained by combining left and right images captured by two cameras, according to an embodiment of the present invention.

The stereoscopic sense attenuator 150 calculates an allowable disparity corresponding to position coordinates of an object 500 of FIG. 10 according to an x-axis 501 and a y-axis 502 by using allowable disparity information indicating an allowable disparity pre-set according to a position of the display screen. Here, the calculated allowable disparity is denoted by reference numeral 503. A stereoscopic sense attenuation degree may be shown as the graph of FIG. 11. In FIG. 11, the stereoscopic sense attenuation degree graph (or allowable disparity graph) may be expressed with a multi-order function 504 indicating an allowable disparity applied to a screen.

In the allowable disparity graph, an x-axis indicates a position from a screen edge to a screen center, and a y-axis indicates a disparity value in a position on a screen. The allowable disparity graph is set so that the screen center along the x-axis has the maximum stereoscopic sense and the screen edge along the x-axis has the minimum stereoscopic sense.

For example, when a stereoscopic image 506 is formed by combining left and right images, an object 508 in the left image and an object 507 in the right image are placed as shown in FIG. 12 due to a disparity therebetween.

When the disparity is set as shown in FIG. 12, the stereoscopic image 506 having a large stereoscopic sense on a screen edge may be displayed.

Thus, the stereoscopic sense attenuator 150 calculates a disparity allowed according to a position of the x-axis.

Referring back to FIG. 9, in block 902, the stereoscopic sense attenuator 150 divides objects to be adjusted into a pre-set number of areas. Here, a size of each of the divided areas may be pre-set, and in the current embodiment, three equally divided areas are described as an example.

In block 903, the stereoscopic sense attenuator 150 adjusts the disparity between the objects to be adjusted by moving pixels in each divided area based on the calculated allowable disparity.

This is described in detail with reference to FIG. 13. The stereoscopic sense attenuator 150 sets a representative pixel in each of the three divided areas and calculates the allowable disparity in a position of each of the set representative pixels by using a stereoscopic sense attenuation degree therein.

The stereoscopic sense attenuator 150 moves pixels forming a stereoscopic image in each of the divided areas by the calculated allowable disparity.

Figure 13:
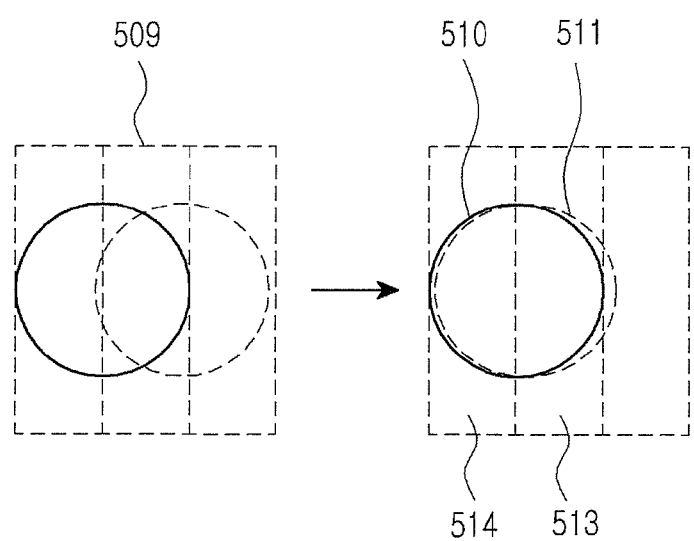
FIG. 13 is an illustrative diagram for describing a process of adjusting a disparity by moving pixels of each of a plurality of stereoscopic areas divided based on a calculated allowable disparity, according to an embodiment of the present invention.

For example, the stereoscopic sense attenuator 150 divides objects to be adjusted into three areas as shown in reference numeral 509 of FIG. 13 and sets a representative pixel in each of the three divided areas.

The stereoscopic sense attenuator 150 calculates the allowable disparity in a position of each of the set representative pixels and moves pixels in the three divided areas to correspond to the calculated allowable disparity. When the object 508 of FIGURE 12 moves in the left direction, an object of which the disparity is adjusted may be indicated by reference numeral 511 of FIG. 13. Since the object 511 of which pixels in each area have moved has a different disparity in each area and thus has different pixel moving distances, the object 511 may be distorted from its original shape. For example, since the allowable disparity is small in an area 514, positions of pixels of the object 511 in the area 514 are almost the same as those of an object 510. However, since the allowable disparity is large in an area 513, positions of pixels of the object 511 in the area 513 are shifted by a difference between the allowable disparity values in comparison to the pixels of the object 511.

As described above, when pixels move according to different disparities in each area, a shape of an object is distorted. Accordingly, in block 803, the controller 100 controls the image warping unit 160 to warp a shape of an object corresponding to the disparity-adjusted object to minimize distortion, thereby generating a final stereoscopic image. That is, a shape of the object 510 is warped to be similar to a distorted shape of the object 511 to match the shapes, thereby increasing correspondence between the two objects 510 and 511 in the final stereoscopic image.

In block 804, the controller 100 controls the display unit 180 to display the final stereoscopic image.

Figure 14:
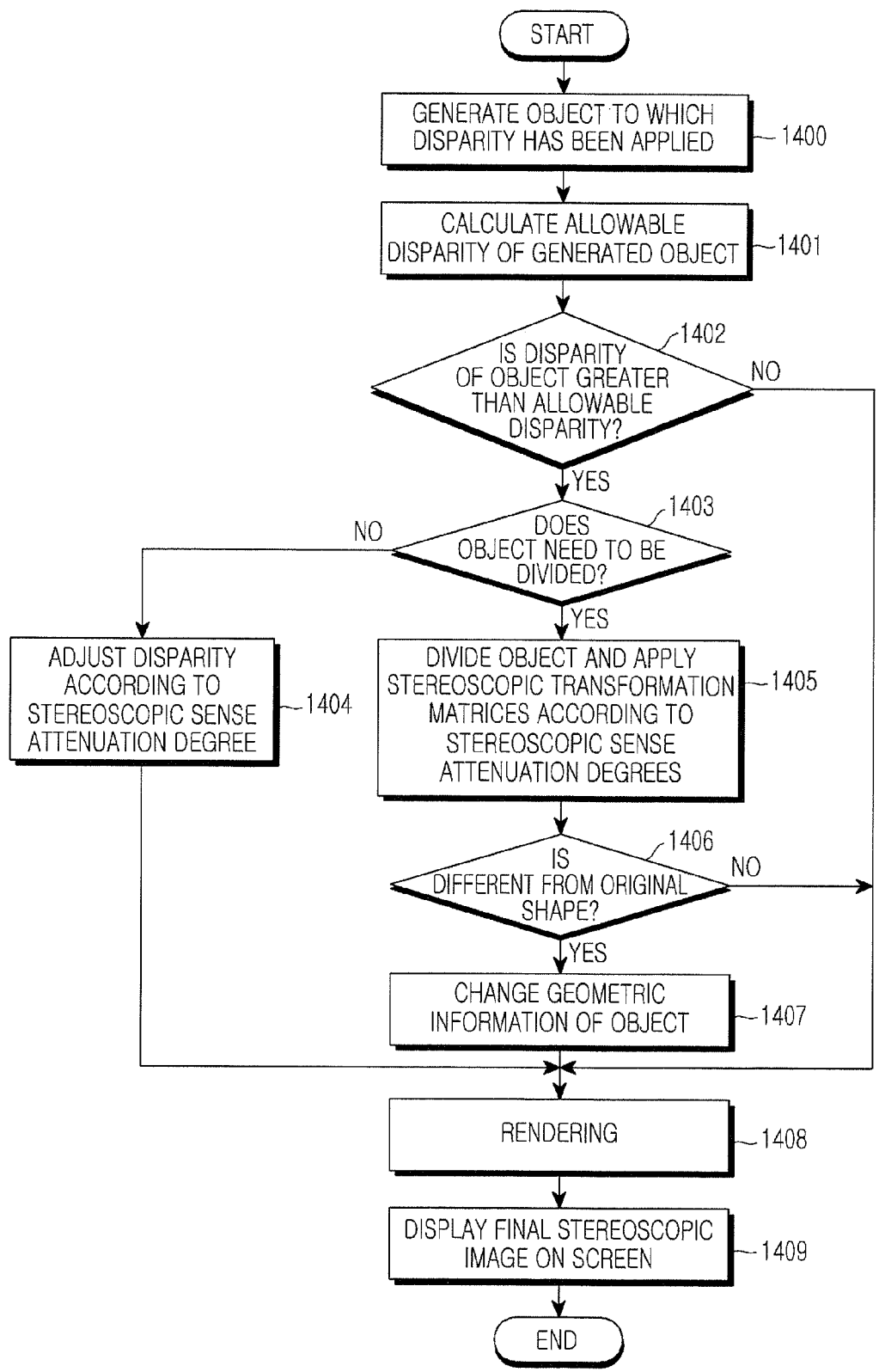
FIG. 14 is a flowchart illustrating a process of adjusting a disparity of a stereoscopic image generated based on a computer graphics technique in a stereoscopic sense attenuator, according to an embodiment of the present invention.

FIG. 14 is a flowchart illustrating a process of adjusting a disparity of a stereoscopic image generated based on a computer graphics technique in the stereoscopic sense attenuator 150, according to an embodiment of the present invention.

Referring to FIG. 14, in block 1400, the controller 100 controls the graphic processor 130 to generate an object to which a disparity has been applied.

In block 1401, the controller 100 calculates the allowable disparity of the generated object.

In block 1402, the controller 100 determines whether the disparity of the generated object is greater than the calculated allowable disparity. If the disparity of the generated object is greater than the calculated allowable disparity, the process proceeds to block 1403. Otherwise, the process proceeds to block 1408. Here, determining whether the disparity of the generated object is greater than the calculated allowable disparity is to determine whether the disparity adjustment is performed to attenuate a stereoscopic sense.

In block 1403, the controller 100 determines whether the object needs to be divided. If the object needs to be divided, the process proceeds to block 1405. Otherwise, the process proceeds to block 1404 to adjust the disparity of the generated object according to a stereoscopic sense attenuation degree.

Figure 15:
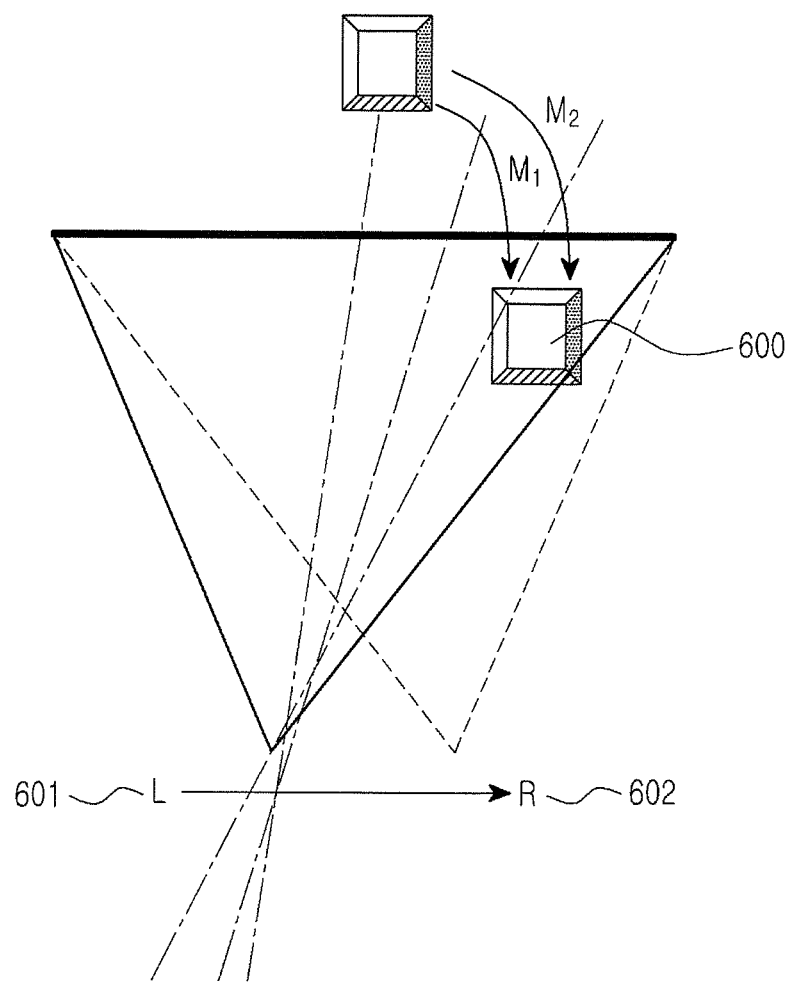
FIGS. 15 and 16 are illustrative diagrams for describing a process of adjusting a disparity by moving a position of an object based on a allowable disparity according to a position on a display screen, according to an embodiment of the present invention.
Figure 16:
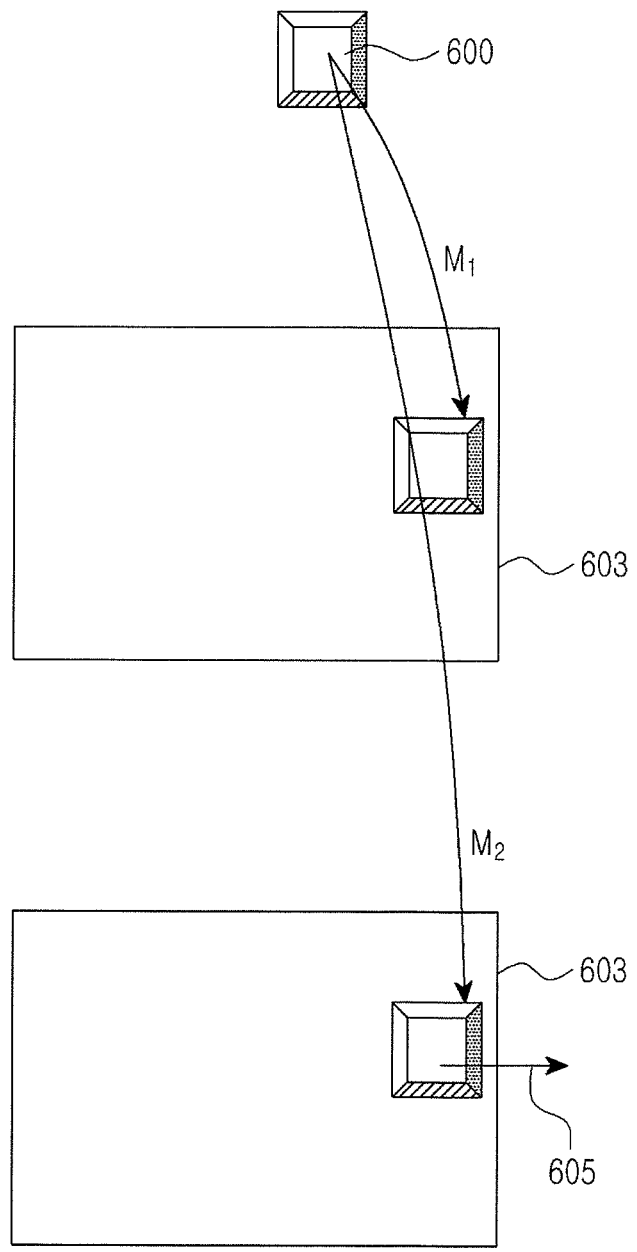

The disparity adjustment is described in detail with respect to FIGS. 15 and 16.

FIGS. 15 and 16 are illustrative diagrams for describing a process of adjusting a disparity by moving a position of an object based on an allowable disparity according to a position on a display screen, according to an embodiment of the present invention.

In FIG. 15, an object 600 is displayed in front of the display screen by applying a first stereoscopic transformation matrix M1 thereto according to a left camera viewpoint 601 and a second stereoscopic transformation matrix M2 thereto according to a right camera viewpoint 602 due to a disparity between the left camera viewpoint 601 and the right camera viewpoint 602 when rendering is performed.

To attenuate a stereoscopic sense of the object 600, the disparity is adjusted. A stereoscopic sense attenuation on a screen edge indicates that the disparity between a left image 604 and a right image 603 with respect to the object 600 to be rendered is reduced.

That is, as shown in FIG. 16, when the object 600 is rendered to the left image 604, to reduce the disparity between the left image 604 and the right image 603, the stereoscopic sense attenuator 150 may adjust the disparity of the object 600 by calculating an allowable disparity according to a position of the object 600, and moving the position of the object 600 in the left image 604 based on the calculated allowable disparity. This situation is a process of reducing the disparity between a left image and a right image by modifying a single stereoscopic transformation matrix corresponding to an object according to the allowable disparity. However, there is a situation of dividing a single object into a plurality of areas according to a scene and applying different stereoscopic transformation matrices to the divided areas, and this situation is described in block 1405 and blocks subsequent to block 1405.

For example, when a position of a certain object shape is placed in front of a position of another object shape, if a single stereoscopic transformation matrix is applied to the certain object, the perspective of a stereoscopic image is ruined. To compensate for this the controller 100 may divide an object into a pre-set number of areas and apply different stereoscopic transformation matrices to the divided areas so that different stereoscopic sense attenuation degrees are applied to the divided areas.

Referring back to FIG. 14, in block 1405, the controller 100 divides the object into a pre-set number of areas and applies a stereoscopic transformation matrix corresponding to a stereoscopic sense attenuation degree to each of the divided areas. This is described in detail with reference to FIGS. 17 to 19.

Figure 17:
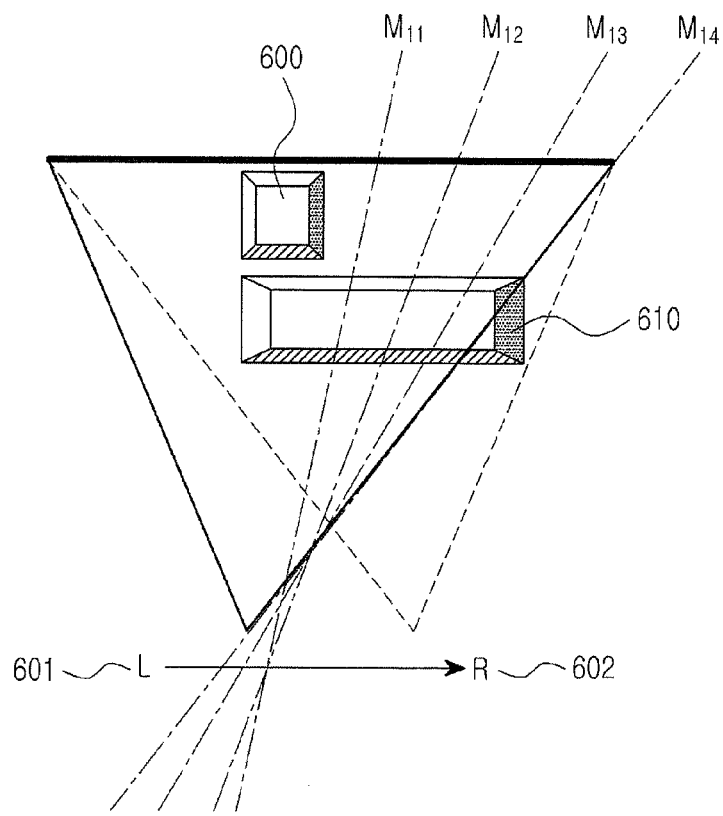
FIGS. 17 to 19 are illustrative diagrams for describing a process of attenuating a stereoscopic sense of a computer graphics based object, according to an embodiment of the present invention.
Figure 18:
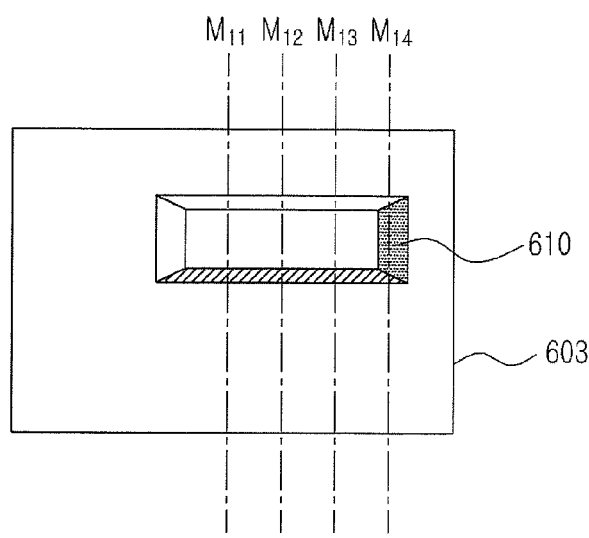
Figure 19:
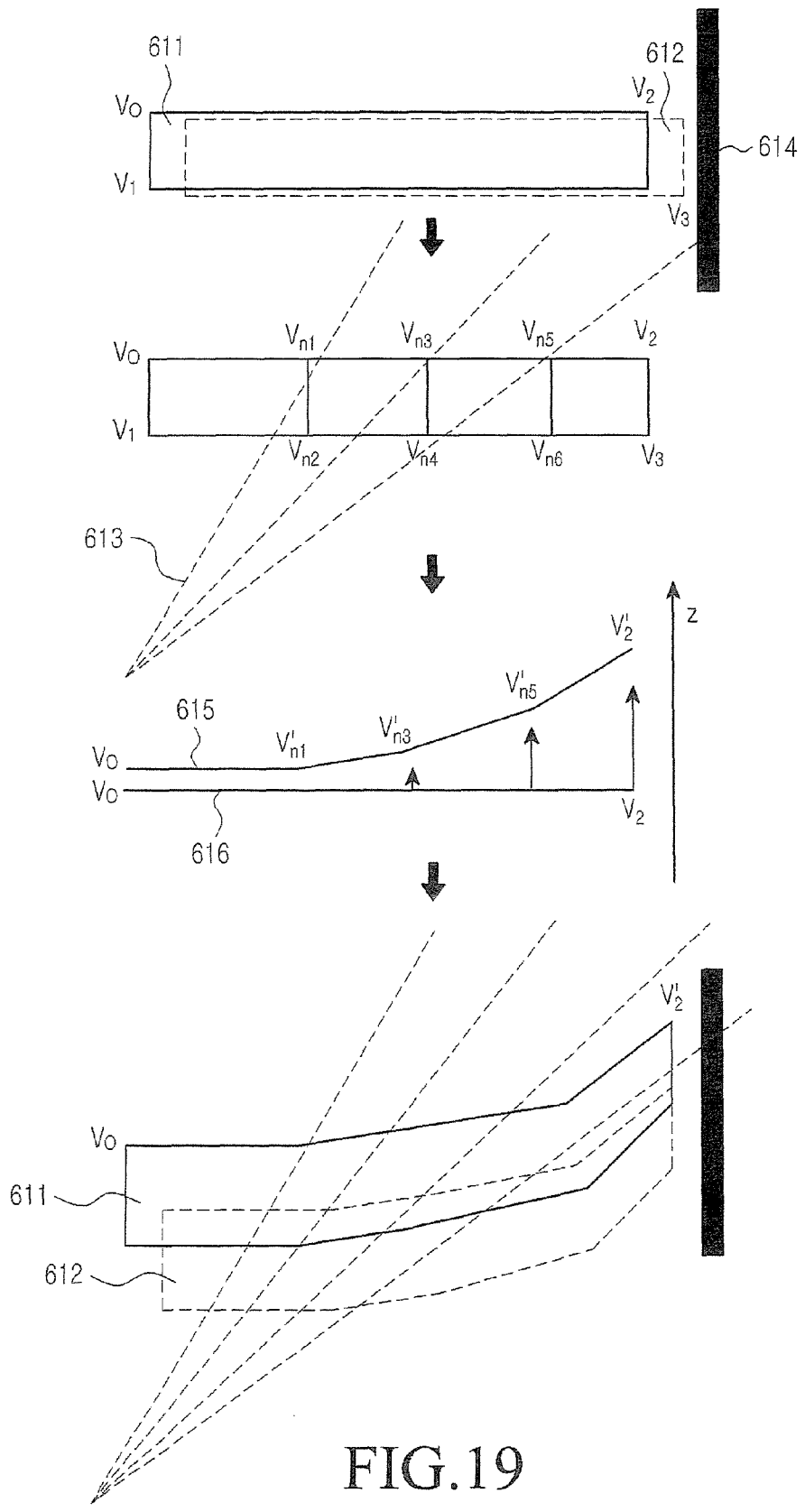

FIGS. 17 to 19 are illustrative diagrams for describing a process of attenuating a stereoscopic sense of a computer graphics based object, according to an embodiment of the present invention.

Reference numeral 610 of FIG. 17 denotes an object to be divided and to which a stereoscopic sense attenuation is applied.

When a disparity of the object 610 is adjusted as in block 1405 described above, since an overall stereoscopic sense of the object 610 is attenuated, the perspective generated between the object 610 and another object 600 is ruined.

To prevent this, the stereoscopic sense attenuator 150 calculates a stereoscopic sense attenuation degree by using an allowable disparity according to a position on a display screen 603, divides the object 610 on the display screen 603 into a pre-set number of areas along an x-axis according to the calculated stereoscopic sense attenuation degrees as shown in FIG. 18, and modifies a stereoscopic transformation matrix for each of the divided areas to apply a different stereoscopic sense attenuation degree to each of the divided areas. The stereoscopic sense attenuator 150 may modify stereoscopic transformation matrices $M_{11}$, $M_{12}$, $M_{13}$, and $M_{14}$ for the divided areas as shown in FIGS. 17 and 18. For example, when an object is expressed with a polygon as shown in FIG. 19, a polygon 611 having apexes $V_0$, $V_1$, $V_2$, and $V_3$ is generated in a right image, and a polygon 612 is generated in a left image. Although the polygon 611 is placed above the polygon 612 in FIG. 19, the polygons 611 and 612 overlap each other when an actual Stereoscopic image is formed.

The stereoscopic sense attenuator 150 divides the polygon 611 into a plurality of areas, calculates an allowable disparity corresponding to apexes of each of the divided areas, and differently applies a stereoscopic sense attenuation degree according to the calculated allowable disparity.

Here, positions of new apexes of the polygon 611 are $V_{n1}$, $V_{n3}$, and $V_{n5}$ and respectively corresponding $V_{n2}$, $V_{n4}$, and $V_{n6}$, showing intervals of the divided areas in which a stereoscopic sense is attenuated.

In addition, dotted lines 613 indicate perspective lines projected based on a viewpoint, and the number of dotted lines 613 is determined according to the number of divided areas.

In other words, when lines are vertically drawn based on $V_{n1}$, $V_{n3}$, and $V_{n5}$ at which these perspective lines 613 meet one side of the polygon 611, points at which the lines meet an opposite side of the polygon 611 are $V_{n2}$, $V_{n4}$, and $V_{n6}$.

Thus, the stereoscopic sense attenuator 150 adjusts the disparity by calculating an allowable disparity according to positions of the apexes $V_{n1}$, $V_{n3}$, and $V_{n5}$ and respectively corresponding $V_{n2}$, $V_{n4}$, and $V_{n6}$ and modifying stereoscopic transformation matrices to which stereoscopic sense attenuation degrees are applied based on the calculated allowable disparity.

Referring back to FIG. 14, in block 1406, the controller 100 determines whether a shape of the object of which the stereoscopic transformation matrices have been modified is different from an original shape thereof. If there is no difference, the process proceeds to block 1408. Otherwise, the process proceeds to block 1407 to change geometric information of the object in the image warping unit 160.

Since distortion, such as a staircase effect, may occur for the object in a final stereoscopic image due to the stereoscopic sense attenuation, the image warping unit 160 selectively changes the geometric information of the object to minimize the distortion. Here, the geometric information includes the apexes of the divided areas.

For example, assuming that a line segment 615 indicates a shape obtained by looking down the polygon 611 in a y-axis direction, the image warping unit 160 moves the apexes of the polygon 611 in a z-axis direction by considering a stereoscopic sense attenuation degree corresponding to apexes of each of the divided areas. Here, a size, a moving direction, and an interval of the geometric information are determined according to the stereoscopic sense attenuation degrees.

That is, the image warping unit 160 moves the apexes $V_{n1}$, $V_{n3}$ $V_{n5}$, and $V_2$ to $V_{n1}'$, $V_{n3}'$, $V_{n5}'$, and $V_2'$ according to the stereoscopic sense attenuation degrees. Here, the line segment 615 indicates a result obtained by moving the apexes, and this shows that a polygon shape is also compensated for in a depth direction according to the stereoscopic sense attenuation degrees.

The moved polygons 611 and 612 shows a shape in which a disparity is reduced as they are close to a display screen edge 614.

In block 1408, to which the process proceeds from blocks 1402, 1404, 1406, and 1407, the controller 100 controls the graphic processor 130 to render the object.

In block 1409, the controller 100 controls the display unit 180 to display a final stereoscopic image on the screen thereof.

As is apparent from the foregoing description, the present invention may minimize eye fatigue and visual displeasure due to excessive disparity by attenuating a stereoscopic sense of an object in a stereoscopic image when the object is to a display screen edge. In addition, although the present invention is described with regard to a stereoscopic image using two viewpoints, the present invention may be applied to a multi-view stereoscopic image.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for attenuating a stereoscopic sense, the apparatus compring:
   a graphic processor configured to generate a stereoscopic image to which a disparity is applied;
   a stereoscopic sense attenuator configured to extract at least one object from the stereoscopic image and perform a stereoscopic sense attenuation for the at least one extracted object according to a position of the at least one extracted object within the stereoscopic image; and
   a controller configured to control the stereoscopic sense attenuator to output a final stereoscopic image in which an amount of the stereoscopic sense attenuation applied to the at least one extracted object corresponds to the a position of the at least one extracted object within the stereoscopic image.

2. The apparatus of claim 1, wherein the stereoscopic sense attenuator is configured to select the at least one extracted object for extraction based upon the at least one object having a disparity greater than an allowable disparity corresponding to the position of the at least one extracted object within the stereoscopic image and to adjust the disparity of the at least one extracted object by using a stereoscopic sense attenuation degree corresponding to the allowable disparity when the stereoscopic sense attenuation is performed.

3. The apparatus of claim 1, wherein the stereoscopic sense attenuation degree is a difference value between a preset allowable disparity and a disparity applied to the at least one extracted object.

4. The apparatus of claim 3, wherein the stereoscopic sense attenuator is configured to determine the allowable disparity corresponding to the position of the at least one extracted object within the stereoscopic image, to divide the at least one extracted object into a preset number of areas, to calculate an amount of the stereoscopic sense attenuation to be applied to each of the divided areas of the at least one extracted object according to a determined allowable disparity for each of the divided areas of the at least one extracted object, and to apply the calculated amount of the stereoscopic sense attenuation to the respective divided areas of the at least one extracted object.

5. The apparatus of claim 4, wherein the stereoscopic image is generated by combining a plurality of images captured by at least two cameras.

6. The apparatus of claim 4, wherein the stereoscopic image is generated based on a computer graphics technique.

7. The apparatus of claim 4, further comprising an image warping unit configured to reduce distortion of the stereoscopic image,
wherein the controller is configured to control the image warping unit to reduce distortion of the stereoscopic image by modifying geometric information of the divided areas of the at least one extracted object.

8. The apparatus of claim 1, further comprising:
a camera configured to capture an input image; and
a preview image generator configured to receive the input image from the camera and generate a preview image based upon the input image to output on a preview screen,
wherein the controller is configured to calculate the amount of the stereoscopic sense attenuation corresponding to the position of at least one extracted object in the input image, and to control the preview image generator to generate the preview image.

9. A method for attenuating a stereoscopic sense in a stereoscopic sense attenuating apparatus to generate a stereoscopic image to which a disparity is applied, the method comprising:
extracting an object for which a stereoscopic sense attenuation is performed from the stereoscopic image; and
outputting a final stereoscopic image in which an amount of the stereoscopic sense attenuation corresponding to a position of the extracted object within the stereoscopic image is applied to the extracted object.

10. The method of claim 9, wherein extracting of object comprises selecting an object from the stereoscopic image having a disparity greater than an allowable disparity corresponding to a position of the extracted object within the stereoscopic image.

11. The method of claim 9, wherein the amount of the stereoscopic sense attenuation is a difference value between an allowable disparity and a disparity applied to the extracted object.

12. The method of claim 11, wherein outputting of the final stereoscopic image comprises:
determining the allowable disparity corresponding to the position of the extracted object;
dividing the extracted object into a preset number of areas; and
calculating an amount of the stereoscopic sense attenuation to be applied to each of the divided areas of the extracted object according to the determined allowable disparity for each of the divided areas of the extracted object and applying the calculated amount of the stereoscopic sense attenuation to the respective divided areas of the extracted object.

13. The method of claim 12, wherein the stereoscopic image is generated by combining a plurality of images captured by at least two cameras.

14. The method of claim 12, wherein the stereoscopic image is generated based on a computer graphics technique.

15. The method of claim 12, further comprising minimizing distortion of the stereoscopic image by modifying geometric information of the divided areas of the extracted object.

16. The method of claim 9, further comprising generating a preview image.

17. An apparatus for attenuating a stereoscopic sense, the apparatus comprising:
a graphic processor configured to generate a stereoscopic image to which a disparity is applied;
a stereoscopic sense attenuator configured to extract at least one object from the stereoscopic image and perform a stereoscopic sense attenuation for the at least one extracted object according to a position of the at least one extracted object within the stereoscopic image;
a controller configured to control the stereoscopic sense attenuator to output a final stereoscopic image in which an amount of the stereoscopic sense attenuation applied to the at least one extracted object corresponds to a position of the at least one extracted object within the stereoscopic image; and
an image warping unit configured to minimize distortion of the final stereoscopic image.

18. The apparatus of claim 17, wherein the stereoscopic sense attenuator is configured to select the at least one extracted object for extraction based upon the at least one object having a disparity greater than an allowable disparity corresponding to the position of the at least one extracted object within the stereoscopic image and to adjust the disparity of the at least one extracted object by using a stereoscopic sense attenuation degree corresponding to the allowable disparity when the stereoscopic sense attenuation is performed.

19. The apparatus of claim 17, wherein the stereoscopic sense attenuation degree is a difference value between a preset allowable disparity and a disparity applied to the at least one extracted object.

20. The apparatus of claim 19, wherein the stereoscopic sense attenuator is configured to determine the allowable disparity corresponding to the position of the at least one extracted object within the stereoscopic image, to divide the at least one extracted object into a preset number of areas, to calculate an amount of the stereoscopic sense attenuation to be applied to each of the divided areas of the at least one extracted object according to a determined allowable disparity for each of the divided areas of the at least one extracted object, and to apply the calculated amount of the stereoscopic sense attenuation to the respective divided areas of the at least one extracted object.

* * * * *